United States Patent [19]
Hobson et al.

[11] Patent Number: 5,825,412
[45] Date of Patent: *Oct. 20, 1998

[54] VIDEO DETECTION APPARATUS FOR MONITORING A RAILROAD CROSSING

[75] Inventors: Gregory Hobson, St. Charles; John R. Wootton, St. Louis, both of Mo.

[73] Assignee: Esco Electronics Corporation, St. Louis, Mo.

[*] Notice: This patent issued on a continued prosecution application filed under 37 CFR 1.53(d), and is subject to the twenty year patent term provisions of 35 U.S.C. 154(a)(2).

[21] Appl. No.: 650,164

[22] Filed: May 20, 1996

[51] Int. Cl.⁶ ....................................................... H04N 7/18
[52] U.S. Cl. .......................... 348/149; 348/143; 348/148
[58] Field of Search ..................................... 348/149, 148, 348/143, 154, 155, 169, 162, 164; 246/23–24, 111, 486–487

[56] References Cited

U.S. PATENT DOCUMENTS

| | | | |
|---|---|---|---|
| 4,413,568 | 11/1983 | De Kermadec | 104/20 |
| 4,578,665 | 3/1986 | Yang | 340/48 |
| 4,843,462 | 6/1989 | Roy et al. | 348/149 |
| 4,857,912 | 8/1989 | Everett, Jr. et al. | 340/825 |
| 5,268,698 | 12/1993 | Smith, Sr. et al. | 12/93 |
| 5,331,312 | 7/1994 | Kudoh | 348/149 |
| 5,429,329 | 7/1995 | Wallace et al. | 246/166 |
| 5,448,484 | 9/1995 | Bullock et al. | 364/436 |
| 5,473,368 | 12/1995 | Hart | 348/155 |
| 5,554,983 | 9/1996 | Kitamura et al. | 348/149 |
| 5,576,972 | 11/1996 | Harrison | 364/516 |

*Primary Examiner*—Tommy P. Chin
*Assistant Examiner*—Vu Le
*Attorney, Agent, or Firm*—Polster, Lieder, Woodruff & Lucchesi LC

[57] ABSTRACT

Apparatus (10) monitors a railroad crossing (X) for the presence of an object (H, V, A) in the crossing. The apparatus determines if an object is of sufficient size to damage to a train (1) approaching the crossing, and provides an alarm (Sa) to an approaching train so it can be timely halted. This prevents injury to people or other objects in the crossing, or to the train and its occupants. A camera (14) continuously views the crossing to obtain images of the crossing. An image processor (28) processes images, establishes the presence of objects in the crossing, and determines the size of the object. If appropriate, an alarm (26) is activated and an alarm signal is sent to the train through a relay (36) transmitter (44), and on board receiver (46). An audio alarm (48) on the train is sounded in response to receipt of the signal. The apparatus is unmanned and performs its monitoring function in a non-invasive manner by which its operation does not interfere with that of vehicles, pedestrians, or barriers (G) which may also be in place at the crossing.

25 Claims, 2 Drawing Sheets

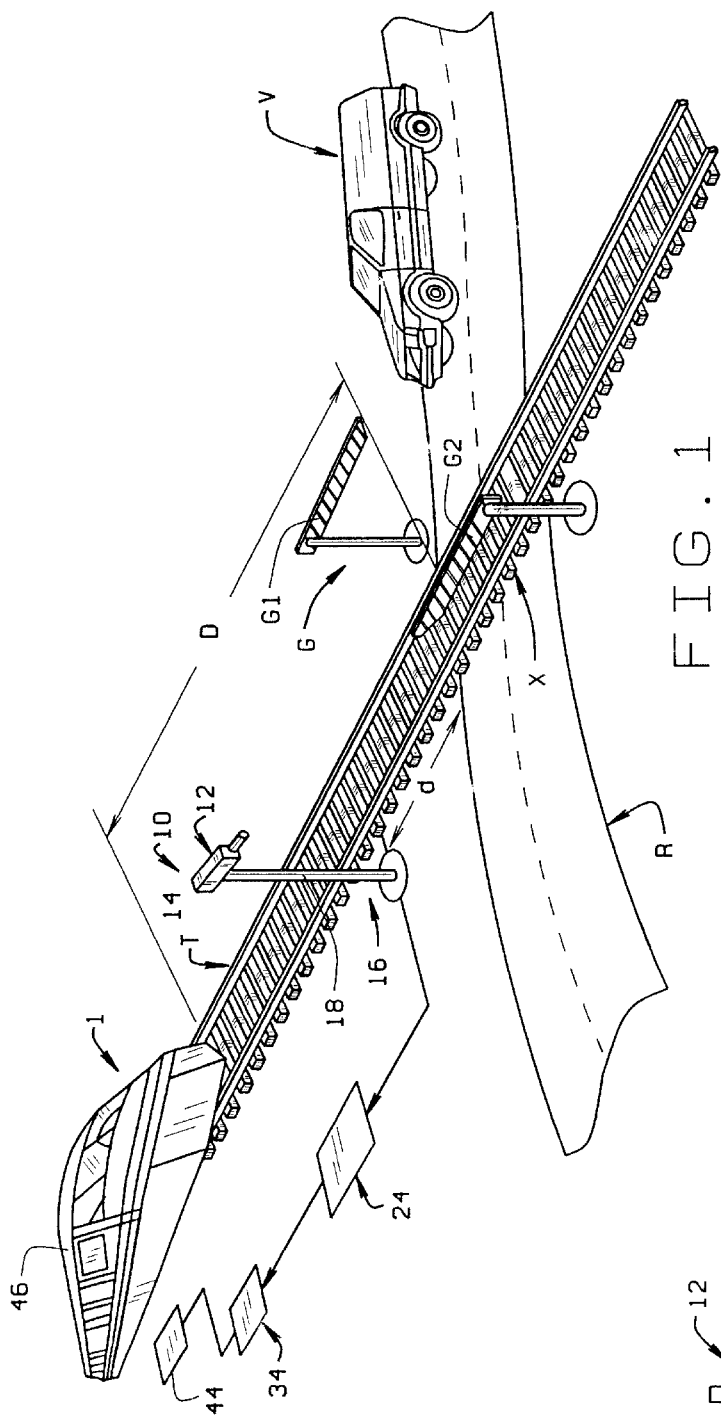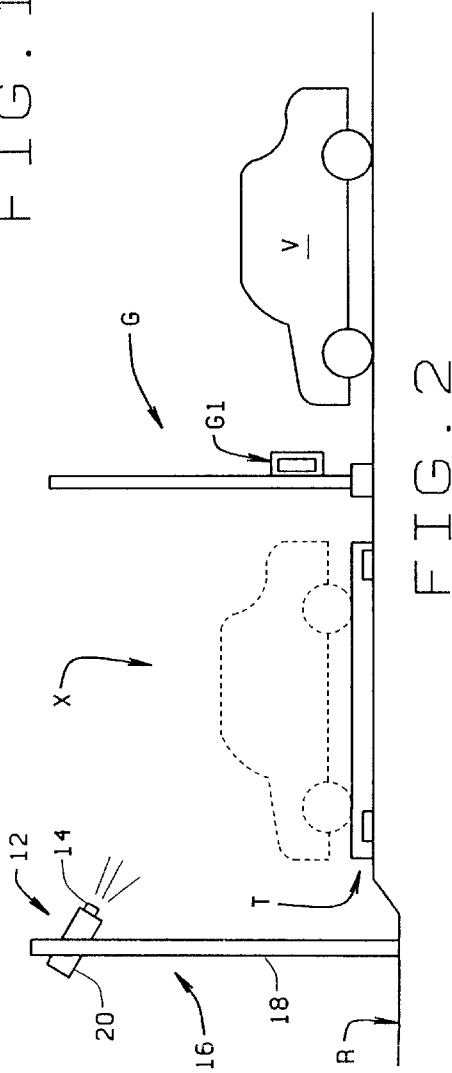

VIDEO DETECTION APPARATUS FOR MONITORING A RAILROAD CROSSING

BACKGROUND OF THE INVENTION

This invention relates to railroad safety systems, and more particularly, to a video detection apparatus for viewing a railroad crossing to determine if the crossing is clear or whether vehicles, persons, animals or other objects are in the crossing. Further, the apparatus sends an alarm signal to a train approaching the crossing if one or more of these objects is identified as being in the crossing. This is done so the train can be halted prior to its reaching the crossing, thereby preventing injury to a person or animal, or damage to the vehicle, train, or other object in the crossing.

Across the country there are thousands of railroad crossings. At a crossing, a railroad track intersects a roadway used by vehicular traffic; although in some instances, the roadway may be a pathway for pedestrian rather than vehicular traffic. Typically, although not always, the crossing is equipped with some type of warning signal and/or crossing guard. The former may be, for example, a series of flashing lights mounted on a pole adjacent the crossing. A common arrangement for these lights is side-by-side on a pole immediately below a crossbuck sign also mounted on the pole. When a train is within a predetermined distance of the crossing, the lights begin alternately flashing "on" and "off" to indicate approach of a train. Sometimes, this visual alarm is complemented by an audio alarm such as a gong or bell in the belief that by attracting more than one sensory response, the chances are better that the alarm will be more readily perceived and heeded. A crossing guard comprises some type of physical barrier which is interposed across the roadway on the side of the road from which vehicles approach the crossing. The most common type of barrier includes a gate arm pivotally mounted to a pole adjacent the roadway. A crossing gate mechanism is activated by approach of the train to lower the arm across the lane or lanes of the road over which vehicles approach the track. A signal switch is installed adjacent the track a predetermined distance before the crossing and the switch is activated by passage of the first car of the train, usually the engine. Activation of the switch lights the lights, sounds the alarm, and lowers the gate. A second switch is located on the other side of the crossing. Passage of the last car in the train past this switch de-energizes the alarm and guard systems, shutting off the lights, silencing the alarm, and raising the barrier arm.

Tragically, the alarm and barrier system just described does not always work, and often the consequences are fatal. Systems malfunction or fail for a myriad of reasons not the least of which is that the various components are constantly exposed to the elements, or are the victim of vandals. Oftentimes, drivers of vehicles are inattentive and do not see or hear the visual and audio alarms. Sometimes people are in a hurry and not willing to wait until a train passes so they can be about their business. These people will attempt to drive around the barrier in their way in the hope that they can work their way through the crossing before the train reaches it. Occasionally, a vehicle may stall on the crossing and the driver may stay with his vehicle in a vain attempt to somehow move it out of the way before a train arrives. It will also be appreciated that pedestrians are not constrained by barriers such as a gate, and that animals even if they see the lights, hear the noise, or perceive any barrier, are similarly not constrained from disregarding them and entering into the path of an oncoming train.

A train traveling at speed has a tremendous amount of inertia which must be overcome in order to quickly stop it. A quick stop for a train may be on the order of a half a mile. Further, many crossings are situated such that an engineer or brake man has little, if any, reaction time to try and stop a train if he is able to discern a vehicle, person or animal in an approaching crossing. Or, in inclement weather, the train may actually be at the crossing before an object is discernible in the crossing due to darkness, rain, or fog. By then, it is too late to avoid an accident. And, even if a train can be significantly slowed before reaching the crossing, it still may have enough momentum to damage or destroy anything in its path. In addition to the damage or harm possibly inflicted on those outside the train, those on the train may also be injured. Crossing accidents often cause some of the cars of the train to derail with persons in those cars being injured. People in other railroad cars are often shaken or jolted by the sudden deceleration which takes place during emergency braking with injuries resulting. And, while the safety of people, both on and off a train is paramount, there can also be substantial property damage resulting from a collision or sudden stoppage of the train.

SUMMARY OF THE INVENTION

Among the several objects of the present invention may be noted the provision of apparatus for viewing a railway crossing to determine if an object (vehicle, person, animal, other object) is present in a railway crossing;

the provision of such an apparatus for further determining if the object is of sufficient size to cause damage to a railway train approaching the crossing is in the crossing and for halting the train so as not to harm the object, nor to harm the approaching train and its occupants;

the provision of such apparatus to automatically, continuously obtain an electro-optical image of the crossing, and to process and evaluate the image once the approaching train is within the predetermined distance of the crossing, the evaluation including a determination as to whether a perceived object exceeds a predetermined minimum size;

the provision of such apparatus which is unmanned;

the provision of such apparatus to provide an alarm signal to the approaching train if the evaluation reveals an object in the crossing, to validate a received alarm signal and to halt the train only when the alarm signal is validated, and to effect halting of the train in response to a validated signal;

the provision of such apparatus to function at all times of the day and night, and under all weather conditions and to effectively operate to warn a train approaching a crossing once an object has been detected in the crossing;

the provision of such apparatus which is a non-invasive apparatus which is readily installed at a railway crossing and does not interfere with the movement of vehicles, people, or animals, does not interfere with train approach warnings or barriers already in place at the crossing, or their operation, or with an approaching train;

the provision of such apparatus to provide an increased margin of safety both to people using the crossing, and trains approaching the crossing by timely stopping an approaching train as soon as threat of harm to people using the crossing and people on a train approaching the crossing is perceived;

the provision of such apparatus which is fail safe;

the provision of such apparatus which requires little maintenance and readily accessible when repair or maintenance functions have to be performed;

the provision of such apparatus which is particularly usefull when installed in remote, rural locations;

the provision of such apparatus which can be selectively installed at crossings identified as being especially dangerous, or as part of an overall monitoring system in highly populated or highly traveled areas where the possibility of objects being in the crossing is substantially higher than in rural or low volume travel areas; and, the provision of such apparatus to save lives, and to reduce injury and property damage at a relatively low cost.

In accordance with the invention, generally stated, apparatus is provided for monitoring a railroad crossing for the presence of an object in the crossing. The apparatus further determines if the object (people, animals, vehicles, other objects) are of a sufficient size to cause damage to the train if struck by the train. The apparatus provides an indication of the object's presence to an approaching train so the train can be timely halted, thereby preventing injury to people or objects in the crossing, or to the train and its occupants. A television camera or other electro-optical device views the scene and continuously monitors the crossing site to obtain images of the site and the presence of any objects in the crossing. An image processor processes the electro-optical images obtained, once a train approaches to within a certain distance of the crossing. The processor establishes both the presence of an object in the crossing, and whether the object is of sufficient size that the train should be warned of its presence. An alarm unit is responsive to an output from the processor to provide an alarm signal to the approaching train as to the presence of the object. The signal is supplied to the train through a relay system including a transmitter up the track from the crossing and a receiver on the train, and an alarm on the train is sounded in response to the alarm signal. In response to the alarm signal, the train may be halted so that it stops short of the crossing. This would prevent injury to people in the crossing, people on the train, the train itself, or vehicles or other objects in the crossing. Other objects and features will be in part apparent and in part pointed out hereinafter.

BRIEF DESCRIPTION OF THE DRAWINGS

In the drawings, FIG. 1 is a representation of a railroad crossing and apparatus of the present invention used to view the crossing to warn an approaching train if an object is present in the crossing;

FIG. 2 is another representation of the crossing illustrating the mounting of a camera of the apparatus for viewing the crossing; and, FIG. 3 is a block diagram representation of an image receiving and processing portion of the apparatus for processing an image of the crossing and for providing an audio alarm signal to a train approaching the crossing.

Corresponding reference characters indicate corresponding parts throughout the drawings.

DESCRIPTION OF A PREFERRED EMBODIMENT

Figure 3:
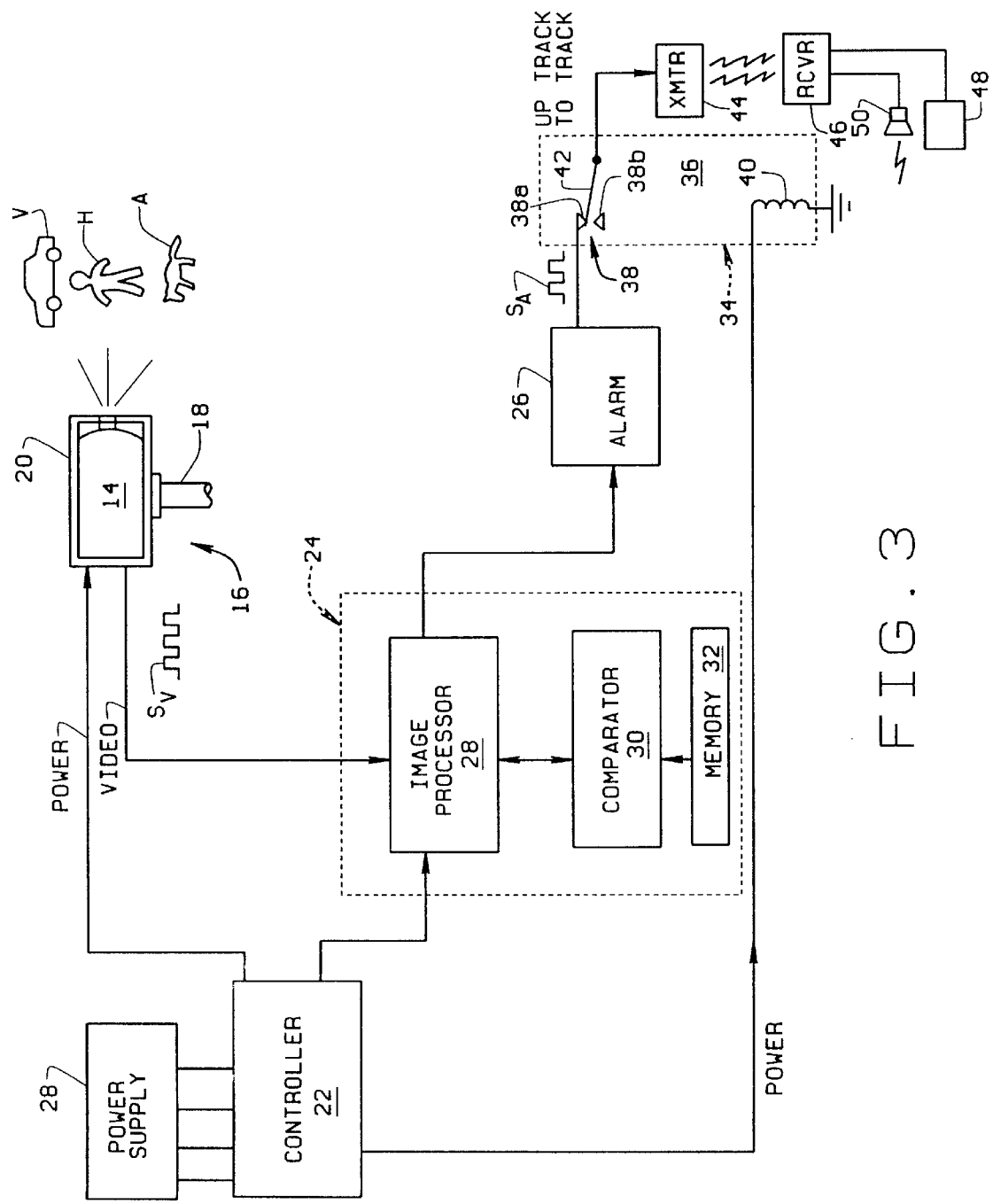

Referring to FIG. 1, a railroad crossing X is depicted. A two-lane road R intersects a railroad track T at the crossing; although it will be understood that road R could have any number of lanes. An unmanned apparatus 10, as described hereinafter, continuously monitors crossing X which is shown as having a conventional crossing guard system G to provide a barrier to vehicles V or pedestrians (not shown) when a train 1 is approaching the crossing. The guard system comprises two crossing guards G1 and G2 respectively located on opposite sides of the crossing. Each guard provided is pivotally mounted on a pole P and is movable from a vertical, raised position to a horizontal, lowered position to present a barrier to the lane of traffic approaching the crossing. Although not shown, it will be understood that the guard system may be augmented with red lights which flash on and off, or a bell which is sounded as a train approaches. It will further be understood that many railroad crossings, especially those in remote, rural areas may not have a crossing guard system G, or any other type of system to warn of an approaching train. In addition, crossing guard G can be readily defeated merely by a vehicle driving around the lowered barrier onto the tracks. Pedestrians or animals can just walk around or under the barrier onto the tracks. Such an occurrence now creates a danger to a vehicle, person, animal or other large object finding its way onto the tracks, as well as to the oncoming train and its occupants.

Apparatus 10 of the present invention is particularly useful in protecting the lives of people occupying a vehicle sitting in the crossing, pedestrians, as well as the train and people onboard the train. Once activated, apparatus 10 not only continuously views the crossing site, but also determines if a) there is an object in the crossing, and b) if the object is larger than a certain size. That size is such that if it was struck by the train, the object, train, or both, could be injured or damaged. If such a sizable object is detected, a warning is provided the approaching train. If the warning occurs sufficiently in advance of the train reaching the crossing, the train can be brought to a complete halt before reaching the crossing and striking anyone or anything.

Apparatus 10 obtains information about the crossing in a non-invasive manner. To do this, the apparatus first includes a viewing means 12 for viewing crossing site X and obtaining an electro-optical image of the crossing site and the presence of any object in the crossing. Means 12 comprises an electro-optical device, for example, a television camera 14. However, apparatus 10 is capable of working with any video sensor that operates in the visible and infrared portions of the light spectrum. Electro-optical sensor 14 monitors crossing X at all times of the day and night, and in all weather conditions. A means 16 is provided for mounting the camera in a position from which it can adequately view the crossing. In the crossing site depicted in FIGS. 1 and 2, the camera is shown mounted on a pole 18 positioned a distance d from the crossing site. This distance d is such that if a vehicle V, person H, animal A or other object is in the crossing, it will be detected by the camera. Means 16 includes the bracketry required to mount the camera on pole 18 at an appropriate height, and to set and maintain the camera orientation at the crossing site. As so installed, the camera has a clear and unobstructed view of crossing X at all times. It will be understood that the depiction of the camera and its installation is illustrative only, and that camera may be installed in any convenient manner which provides a complete, unobstructed view of a crossing. Also, camera 14 may be installed in a weatherproof, vandal resistant housing 20 so the camera will remain operable during inclement weather and cannot easily be damaged by vandals. Means 16 does allow the camera to move slightly in the presence of high winds, but the pole on which the camera is mounted is sufficiently sturdy that the camera remains generally in place at all times.

Operation of camera 14 is enabled by a control means or controller 22 which also controls operation of an image processing means 24 and alarm means 26 of the apparatus. The control means includes a power supply 28 which supplies power to the camera and other components. Typically, controller 22 powers the camera so that it is continuously viewing the crossing. The controller activates the other components only when a train approaches to within a predetermined distance D of the crossing. Thereafter, the control means maintains the camera and other components in operation at least until the train reaches the crossing.

Processor means 24 receives a video signal Sv from camera 14. The processor means includes an image processor 28 for processing the signal to determine whether or not a vehicle V, person H, animal A, or other object is in the crossing. Processor 28 can be any type of image processor compatible with electro-optical sensor 14 and capable of converting signal Sv into a video image of the crossing. For this purpose, the image processor provides appropriate amplification, filtering, and digital manipulation (on a pixel by pixel basis, for example) of the received video input so the resultant output from the image processor shows both the elements normally viewed in the crossing (the railroad tracks, cross ties, etc.), as well as any object therein.

After image processing, the resultant processed image is supplied as an output to a comparator 30. Also supplied to the comparator module is an input from a memory module 32. Memory 32 has stored within it a representation of the crossing, this representation being without the presence of any object in it. Comparator 30 performs an evaluation of the processed image vis-à-vis the representation from the memory 32. If the two images compare, this means there is no discernible object in the crossing and that the crossing is "all clear". Accordingly, the train can continue approaching the crossing however it normally does. It will be appreciated that the comparison performed by the comparator is an on-going comparison. That is, a new comparison is made each time a video image signal from the camera is received by processor 28, with the processed image being compared by comparator processor 30.

So long as the image comparison indicates that there is no object in the crossing, apparatus 10 provides no output to the approaching train. If, however, a comparison indicates the presence of an object, then image processor 28 further processes the crossing image to determine whether or not the object is greater than some minimum size. For example, if the object were a small animal such as a rabbit or dog, then train 1 would not be stopped but would continue onward as it normally would. But, if the size of the object indicates that it is a person, a vehicle, a large animal, or a large object, where the impact with the train would not only injure the person or animal, or destroy the vehicle or other inanimate object, but could also cause damage to the train and injury to its occupants, then an alarm is provided to the train.

Alarm means 26 is supplied an input from processing means 24 when the image processor 26 determines that the size of an object exceeds a minimum size. The input to the alarm means enables it to produce an alarm signal Sa. This signal is supplied to a train 1 via a relay means 34 comprising a relay 36 by which a signal is routed to the train. Relay 36 has a set 38 of contacts 38a, 38b, and a coil 40 which is energized by power supply 28. When energized, a contact arm 42 of the relay closes on contact 38a to complete a circuit path to a transmitter 44 located up the track from the crossing. As the train passes the transmitter, a receiver 46 on the train receives the transmitted audio alarm signal Sa. Signal Sa is then supplied to an audio alarm 48 on the train.

Sounding of the alarm alerts train personnel of the presence of an object at the crossing which is sufficiently large that striking it could cause injury to persons and damage to property. The train personnel can then take appropriate action to slow or stop the train.

If during operation of the apparatus, there is a failure of power supply 28, then coil 40 is de-energized and contact arm 42 moves from contact 38a to contact 38b. Now, no alarm signal can be sent to a train until the power failure condition is corrected. This provides a "fail safe" mode of operation since the absence of an alarm signal does not inadvertently effect the normal operation of the train. Similarly, controller 22 is responsive to the operation of camera 14 and processing means 24. If there is a failure in either of these units, the controller acts to prevent an alarm signal from being incorrectly sent to the train. One way of doing this, for example, is for the controller to cut off the supply of power to relay 36 so the relay is again de-energized.

What has been described is an apparatus for installation and use at a railroad crossing to warn the operators of a train approaching the crossing when a vehicle, person, animal, or other object is in the crossing. Use of the apparatus is intended to save lives, and reduce injury and property damage, all at a relatively low cost. In operation, the apparatus views a crossing when an approaching train is within a predetermined distance of the crossing. A camera or other electro-optical device of the apparatus continuously obtains a visual image of the crossing. An image processing portion of the apparatus processes and evaluates an image obtained by the camera or device when a train gets close to the crossing. The processor ascertains not only if an object is within the area being viewed, but also if the size of the object exceeds a minimum size. The apparatus employs an image processor to produce a visual image of the crossing, as well as ascertain if the object is larger than a predetermined size. An alarm is provided to an approaching train if the image evaluation reveals an object in the crossing. A relay is employed to route the alarm signal between the crossing and the train through a transmitter and a receiver. The train has an on-board audio alarm to which the signal is supplied and which is sounded in response to the signal to alert train personnel. The apparatus functions at all times of the day and night, and during all weather conditions so an image can be obtained and evaluated. The apparatus is an unmanned installation that is readily installed at a railway crossing. The installation is non-invasive and as such does not interfere with vehicular traffic flow or the movement of pedestrians and animals through the crossing. The installation further does not interfere with other warning or barrier systems already in place at the crossing. Use of the apparatus provides an increased margin of safety both to people using the crossing, and approaching trains by providing a timely warning to train personnel so they can try to halt the train prior to its reaching the crossing. The apparatus is easily accessible for maintenance and repair.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. An apparatus for monitoring a railroad crossing site for the presence of an object at the crossing, and for providing an indication thereof to a train approaching the crossing so to prevent harm to both the object in the crossing and the approaching train, comprising:

viewing means for viewing the crossing site and for obtaining an electro-optical image of the crossing site and any object at the crossing site;

comparator means for processing said electro-optical image obtained by the viewing means for establishing the presence of an object at the crossing site;

evaluator means for establishing the size of said object present at the crossing site;

alarm means for providing an alarm signal to a railroad train approaching the crossing site of the presence of an object exceeding a predetermined size at the site, the alarm means providing said alarm signal sufficiently in advance of the train reaching the crossing site that, if appropriate, the train can be brought to a halt prior to reaching the crossing site and striking the object exceeding the predetermined size;

control means for controlling operation of the apparatus for enabling the viewing means from the time the approaching train approaches to within a predetermined distance of the crossing site to a time when the train reaches the crossing site;

and, means for relaying said alarm signal from said crossing site to said train, operation of said relay means being controlled by said control means.

2. The apparatus of claim 1 wherein said apparatus comprises means for non-invasively viewing said crossing site, whereby operation of said apparatus does not interfere with the movement of objects through the crossing nor the operation of other barriers installed at the crossing site to prevent movement through the crossing site when the train is approaching.

3. The apparatus of claim 1 which is operable at all times of day and night and under all weather conditions.

4. The apparatus of claim 1 wherein said viewing means includes electro-optical means for receiving light in the visible and infrared portions of the light spectrum.

5. The apparatus of claim 4 wherein said electro-optical means includes a camera.

6. The apparatus of claim 5 further including mounting means for mounting said camera in a position to adequately view said crossing site.

7. The apparatus of claim 6 wherein said mounting means including a weatherproof and vandal resistant housing in which said camera is installed to protect said camera and allow it to properly function in all weather conditions.

8. The apparatus of claim 1 wherein said comparator means includes memory means for storing a representation of the crossing site as it would appear were no object present in the crossing site.

9. The apparatus of claim 8 wherein said comparator means further includes means for comparing a processed image viewed by said viewing means with said stored representation and for determining from said comparison if an object is present in the crossing site.

10. The apparatus of claim 9 wherein said evaluator means is responsive to an indication of the presence of the object to evaluate the object and determine whether the object is sufficiently large that a warning of the object's presence should be sent to the train.

11. The apparatus of claim 10 wherein said relay means includes a relay having a set of contacts and a coil for moving a contact arm from one contact to another when the coil is energized, a transmitter to which the alarm signal is routed through the relay, and a receiver on the train to which the alarm signal is transmitted by the transmitter.

12. The apparatus of claim 11 further including means installed on said train and responsive to said alarm signal to alert train personnel of the presence of the object in the crossing site.

13. The apparatus of claim 12 wherein the apparatus further includes power supply means controlled by the control means for energizing said coil, said alarm signal being supplied to said train only if said coil is energized, said control means being responsive to the operation of said viewing means, said comparator means, said evaluator means, and said power supply means maintaining said relay coil energized so long as the aforesaid means are properly functioning, but to de-energize said coil if the aforesaid means malfunction so an incorrect alarm signal is not inadvertently sent to the train.

14. In a system for protecting vehicles and pedestrians moving through a railroad crossing from being struck from an oncoming train, said system including a barrier positioned to block vehicle and pedestrian movement when the train approaches to within a predetermined distance of the crossing, the improvement comprising apparatus for viewing the crossing, detecting the presence of vehicles, pedestrians, or objects in the crossing when the barrier is in place, and for providing an indication thereof to the approaching train to allow train personnel to take preventative action to prevent harm to the vehicle, object, or train and injury to pedestrians or persons on the train, the apparatus comprising:

means for viewing the crossing when an approaching train is within a predetermined distance of the crossing to obtain an electro-optical image of the crossing including the presence of any vehicle, pedestrian, or object within the crossing, the viewing means obtaining said image regardless of the time of day and the existing atmospheric conditions;

comparator means for continuously processing said electro-optical image obtained by the viewing means once the train has approached within a predetermined distance of the crossing, the comparator means comparing a processed image with a representation of the crossing to establish whether or not a vehicle, pedestrian, or object is present in the crossing;

evaluator means for determining if the size of a detected object is greater than a predetermined size;

alarm means activated by said evaluator means to provide an alarm signal to the train of the presence of a vehicle, pedestrian, or object exceeding said predetermined size, the alarm means providing said alarm signal sufficiently in advance of the train reaching the crossing for the train, if appropriate, to be brought to a halt prior to reaching the crossing thereby to prevent injury to pedestrians, people on the train, or damage to the vehicle or the train;

relay means for relaying said alarm signal to the train; and, means on board the train responsive to said alarm signal to sound an audible warning to train personnel.

15. The improvement of claim 14 further including control means for enabling the comparator means to process images from the viewing means and the relay means to route the alarm signal to the train.

16. The improvement of claim 15 further including power supply means controlled by said control means to supply power to said viewing means, comparator means, evaluator means, alarm means, and relay means.

17. The improvement of claim 16 wherein said viewing means includes a camera capable of receiving incident light in the visible and infrared portions of the light spectrum.

18. The improvement of claim 17 wherein said comparator means includes means for storing a representation of the crossing and for comparing processed images of the crossing with the representation to ascertain if a vehicle, pedestrian, or other object is in the crossing.

19. The improvement of claim 18 wherein said relay means includes a relay having a set of contacts and a coil for moving a contact arm from one contact to another when the coil is energized, a transmitter to which said alarm signal is routed through the relay, and a receiver on the train for receiving and alarm signal transmitted by the transmitter, said alarm signal being supplied to said train only if said coil is energized.

20. The improvement of claim 19 wherein said control means is responsive to the operation of said viewing means, said comparator means, said evaluator means, and said power supply means to maintain said relay coil energized so long as the aforesaid means are properly functioning, but to de-energize said coil if the aforesaid means malfunction so an incorrect alarm signal is not inadvertently sent to the train.

21. A method of warning a railroad train traveling over a railroad track intersected by a crossing at which automotive vehicles and pedestrians cross from one side of the track to the other of the presence of a vehicle, pedestrian, or object in the crossing as the train approaches the crossing, timely warning the train of the presence of the vehicle, pedestrian, or object in the crossing enabling train personnel to take preventive action to prevent harm to the vehicle, object, or train and injury to pedestrians or persons on the train, the method comprising:

electro-optically obtaining an image of the crossing including the presence of a vehicle, pedestrian, or object within the crossing, the image being obtained regardless of the time of day and existing atmospheric conditions;

processing the image, said processing being continuous from a point where the train approaches to within a predetermined distance of the crossing until it reaches the crossing;

determining from the processed visual image the presence of a vehicle, pedestrian, or object in the crossing;

responsive to the determination of the presence of an object, determining from the processed visual image, the size of the object;

responsive to the determination of the presence of a vehicle, pedestrian, or object exceeding a predetermined size, providing an alarm signal to the train, said alarm signal being provided sufficiently in advance of the train reaching the crossing that the train can be halted prior to reaching the crossing and striking the vehicle or pedestrian;

and, wherein providing said alarm signal to said train includes routing said signal through a relay means which, when energized, routes said signal to a transmitter for transmission of said signal to a receiver on board the train.

22. The method of claim 21 wherein processing the image includes:

storing a reference representation of the crossing as the crossing appears if no vehicle or pedestrian is present;

comparing the processed image with said reference representation; and, if said comparison indicates the presence of an object in the crossing, further processing the image to determine if the object is of a size which could cause damage to the train if struck by the train.

23. The method of claim 22 further including providing said alarm signal only if said further processing indicates that the object is of a size which could damage the train if struck by the train.

24. The method of claim 21 further including controlling the processing of an image, and the initiation and routing of an alarm signal to the train, said controlling including monitoring the operation of the means by which the aforesaid functions are performed and disabling the relay means if a malfunction occurs so an alarm signal is not inadvertently sent to the train.

25. The method of claim 21 to be a non-invasive method of viewing the crossing and warning a train so as not to interfere with the passage of vehicles or pedestrians through the crossing nor the operation of barrier systems which may be in place at the crossing to prevent passage of vehicles and pedestrians when a train is approaching.

* * * * *